United States Patent Office 3,542,859
Patented Nov. 24, 1970

3,542,859
FLUORINATED ETHERS
Morton H. Litt and Francis W. Evans, Morristown, N.J., assignors to Allied Chemical Corporation, New York, N.Y., a corporation of New York
No Drawing. Original application Oct. 1, 1965, Ser. No. 492,276, now Patent No. 3,453,333, dated July 1, 1969. Divided and this application Sept. 3, 1968, Ser. No. 778,888
Int. Cl. C07c 59/22
U.S. Cl. 260—514                5 Claims

ABSTRACT OF THE DISCLOSURE

This invention relates to novel fluorinated acids derived from fluorinated ethers. The fluorinated ethers contain at least one halogen atom other than fluorine, this halogen atom serving as a reactive site in the preparation of the fluorinated acids. The fluorinated acids are useful as surfactants.

---

This is a division of application Ser. No. 492,276 now U.S. Pat. 3,453,333.

This invention relates to novel fluorine-containing ethers and to the preparation thereof. More particularly, this invention relates to fluorinated ethers containing at least one halogen substituent other than fluorine as a potential reactive site.

Heretofore perfluorinated aliphatic ethers have been prepared by electrolyzing the corresponding dialkyl ethers in hydrogen fluoride. These perfluorinated ethers have a high degree of chemical inertness and, thus, it is extremely difficult to use them as intermediates in the preparation of other compounds. This chemical inertness results from the strong carbon-to-fluorine bond. More reactive compounds can be produced by replacing at least one of the fluorine atoms of the above-described perfluorinated ethers with a different halogen to thereby provide a more active site. Additionally, a wider range of properties can be obtained if the process for producing the fluorinated ether is such that hydrogen or other substituents can be placed in selected positions.

It is, therefore, an object of the present invention to provide fluorine-containing ethers which are useful as intermediates in the preparation of other compounds.

Another object of this invention is to provide fluorine-containing ethers in which at least one substituent is a member of the group consisting of chlorine, bromine or iodine.

A further object of this invention is to provide a process for the preparation of the above-described ethers.

Additional objects and advantages of this invention will be apparent from the following detailed description thereof.

The fluorine-containing ethers of the present invention are represented by the formula

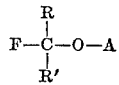

wherein R and R' are independently either fluorine or a perhalogenated alkyl radical in which the halogen atoms are selected from the group consisting of fluorine and chlorine with at least one fluorine atom being attached to each carbon atom and A is a member selected from the group consisting of radicals of the formulas

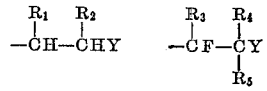

and

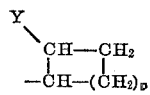

where $R_1$ and $R_2$ are independently selected from the group consisting of chlorine, hydrogen and alkyl of 1 to 10 carbon atoms; Y is selected from the group consisting of chlorine, bromine and iodine; $R_3$ and $R_4$ are independently selected from the group consisting of fluorine and hydrogen; $R_5$ is selected from the group consisting of fluorine, hydrogen, chlorine, bromine, iodine, and perfluorinated alkyl of 1 to 16 carbon atoms with $R_3$ always being fluorine when both $R_4$ and $R_5$ are fluorine; and $p$ is an integer of 1 to 9.

These ethers are preferably prepared by first reacting a perhalogenated ketone or a perhalogenated acyl fluoride with an ionizable fluoride salt to form a fluorinated organic salt and then reacting the organic salts with an olefin and a halogen other than fluorine (chlorine, bromine, iodine and diatomic interhalogens thereof such as iodine monochloride) to form the desired ether. The first reaction is illustrated by the following equation:

(I) 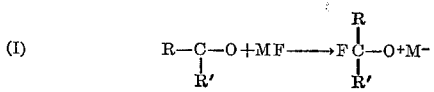

where R and R' have the meanings given above, and M is a member selected from the group consisting of potassium, cesium, silver, rubidium, and tetraalkylammonium ions.

The olefin reacted with the fluorinated organic salt in the second reaction is selected from the group consisting of compounds of the following formulas:

(1) $\quad R_1CH=CHR_2$ where $R_1$ and $R_2$ have the meanings given above;

(2) $\quad R_3CF=CR_4R_5$ where $R_3$, $R_4$ and $R_5$ have the meanings given above; and (3) 

where $p$ has the meaning given above. The reactions of the above olefins and a halogen with the fluorinated organic salts are illustrated by the following equations:

(1) 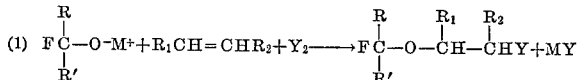

(2) 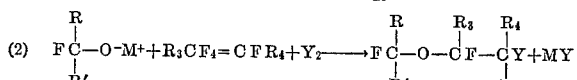

(3) 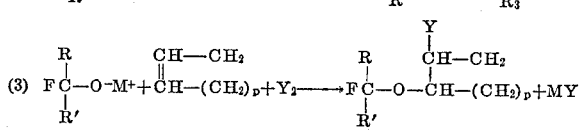

When a perhalogenated acyl fluoride, e.g., a compound of the formula:

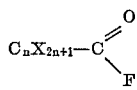

where X is fluorine or chlorine with at least one fluorine being attached to each carbon atoms, and $n$ is preferably an integer of 0 to 10, is employed as a starting material, an ether is produced in which at least one of the radicals R and R' is fluorine. Such ethers are illustrated by the formula $C_nX_{2n+1}$—$CF_2$—O—A, where X, A and $n$ have the meanings give above. On the other hand, when a perhalogenated ketone, e.g., a compound of the formula

where $m$ and $m'$ are preferably integers of 1 to 8 with the sum of $m$ and $m'$ preferably not exceeding 10, and X is fluorine or chlorine with at least one X on each carbon atom being fluorine, is employed as a starting material, an ether is produced in which both R and R' are a prehalogenated alkyl radical. Such ethers are illustrated by the formula:

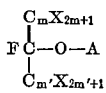

When a perhalogenated ketone is used, not only are the ether products new compounds but the intermediate salts of the formula:

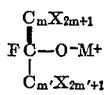

where X, M, $m$ and $m'$ have the meanings given above, are also novel.

The reaction between one of the above-defined perhalogenated ketones or perhalogenated acid fluorides and a fluorinated compound of the formula MF to form a fluorinated organic salt proceeds readily upon admixture of the reactants and can be conveniently carried out at room temperature. A suitable procedure is to add the fluorinated ketone or acyl fluoride to a suspension of the MF salt in a liquid medium which is a solvent or partial solvent for the desired product. Suitable liquid media which can be used are lower alkyl nitriles such as acetonitrile, lower alkyl t-amides such as dimethyl formamide, nitrobenzene, butyrolactone, sulfolanes such as 2-methyl sulfolane, and sulfones such as methyl ethyl sulfone. As the size of ketone or acid fluoride molecule increases, the fluorinated organic salt produced becomes less soluble and the yield of product is lowered. It is therefore preferred to use ketones and acid fluorides containing 11 or less carbon atoms, although larger molecules can be used if desired.

Preferably about 0.8 to 4 mols of the fluoride reactant MF is used for each mol of fluorinated ketone or acyl fluoride. The organic salt produced is decomposed by water, and it is therefore recommended that the reaction be conducted under anhydrous conditions. Since tetraalkyl ammonium fluorides are somewhat unstable and difficult to handle, the tetraalkyl ammonium salts are preferably prepared by first making a potassium salt in accordance with Equation I and then reacting the potassium salt with either the tetraalkyl ammonium chloride or a tetraalkyl ammonium perchlorate to form the desired product and a KCl or KClO$_4$ precipitate.

Suitable ketones for use in the present invention include hexafluoroacetone; α-chloropentafluoroacetone; α,α'-dichlorotetrafluoroacetone; α,α,α' - trichlorotrifluoroacetone; α,α - dichlorotetrafluoroacetone; octafluorobutanone; α-chloroheptafluorobutanone; decafluoro-3-pentanone; 2-trifluoromethyl-3-perfluoropentanone; dodecafluoro-3-hexanone; tetradecafluoro-3-heptanone; perfluoro--6-undecanone, etc. Suitable acyl fluorides includes trifluoroacetyl fluoride; carbonyl fluoride; chlorodifluoroacetyl fluoride; pentafluoropropionyl fluoride; β-chlorotetrafluoropropinoyl fluoride; heptafluorobutyryl fluoride; nonofluoropentanoyl fluoride; undecafluorohexanoyl fluoride; tridecafluoroheptanoyl fluoride; pentadecafluorooctanoyl fluoride; prefluoroundecanoyl fluoride.

Attempts have been made to employ as starting materials carbonyl compounds which contain hydrogen. Compounds that have been tried include tetrafluoroacetone, trifluoroacetaldehyde and trichloroacetaldehyde. In each case, the desired fluorinated ether was not obtained. It is believed that this difficulty results from the presence of hydrogen in close proximity to the carbonyl group.

The reaction between a fluorinated organic salt, an olefin and a halogen to form a fluorinated ether also proceeds readily at room temperature. This reaction can be conveniently conducted in the same liquid medium as the first reaction, and it is unnecessary to isolate the fluorinated organic salt formed in the first reaction, but rather the olefin and halogen reactants can be added directly to the reaction mixture. The general formulas of the three groups of olefins which can be employed in the present invention are given above. Illustrative of specific olefins are: $CH_2$=$CH_2$, $CF_2$=$CF_2$, $CF_2$=$CH_2$, $CF_2$=$CFCl$, $CF_2$=$CFBr$, $CHCl$=$CH_2$, $CF_2$=$CFCF_3$, $CH_2$=$CH$—$CH_2CH_3$, $CF_2$=$CFCF_2CF_3$,

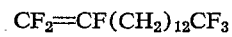

and

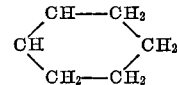

The fluorinated ethers can be separated from the other compounds present in the reaction mixture by fractional distillation. If excess iodine is present, the purification of the fluorinated ether is facilitated if the iodine is first converted to NaI by reaction with an aqueous solution of sodium sulfite prior to the fractional distillation.

A particularly outstanding group of compounds within the scope of this invention are those fluorinated ethers prepared from perhalogenated acetones containing at least three fluorine atoms. The ethers thus prepared possess terminal halogenated isopropyl radicals and can be converted to excellent surfactants by a process hereinafter described. These ethers are represented by the formula:

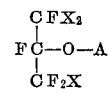

where A has the meaning given above, and X is chlorine or fluorine.

The fluorinated ethers of this invention can be used as intermediate in the preparation of other compounds and, additionally, those ethers which are liquid can be used as solvents for high molecular weight resinous perhalogenated compounds such as solid polychlorotrifluoroethylene resins.

Fluorinated acids can be produced by reacting the fluorinated ethers of this invention with a Grignard reagent to form a magnesium halide adduct, reacting this adduct with $CO_2$ to form a magnesium halide salt, and then acidifying this salt. The sequence of reactions is illustrated by the following equation in which the ether employed is prefluoroisopropyl, 2′-iodotetrafluoroethyl ether.

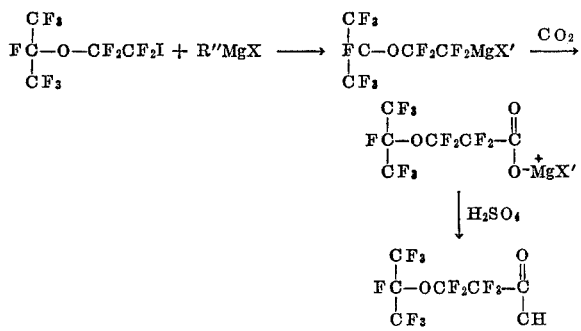

wherein R″MgX′ represents a Grignard reagent in which X′ is the halogen. The reactions involving the Grignard reagent and the carbon dioxide proceed very rapidly and can be conducted at temperatures considerably below 0° C. It is recommended that both of these reactions be conducted at temperatures less than 0° C. in order to better control the reaction rates and prevent decomposition of the Grignard reagent. The fluorinated acids and the alkali metal salts thereof lower the surface tension of water and thus are useful as surfactants. The fluorinated acids and alkali metal salts prepared from perhalogenated ketones are novel compounds.

Those ethers having the formulas:

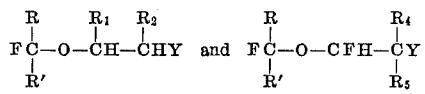

wherein R, R′, $R_1$, $R_2$, $R_4$, $R_5$ and Y have the meanings given above, can be treated to remove hydrogen and halogen, thereby forming vinyl ethers. This dehydrohalogenation can be accomplished by treatment with a strong base. In a typical procedure, 100 grams of the above ether are admixed with 80 grams of NaOH and 80 grams of soda lime and the reaction mixture is distilled, the distillate thus obtained being the desired vinyl ether.

The following examples are given to further illustrate the invention, but it is to be understood that the invention is not to be limited in any way by the details described therein.

EXAMPLE 1

Into a flask equipped with a "Dry-Ice" condenser and a magnetic stirrer were placed 26 grams of anhydrous potassium fluoride and 200 milliliters of acetonitrile. The resulting suspension was stirred, and 82 grams of gaseous hexafluoroacetone were added over a one-hour period, during which time the temperature of the reaction mixture rose from 24° to 42° C. Stirring of the reaction mixture was then continued for an additional two hours, after which almost all of the potassium fluoride had dissolved. The reaction mixture was admixed with 1 liter of dry benzene and cooled, thereby precipitating 91.62 grams of an organic salt which was recovered by filtration. This organic salt was determined to be $(CF_3)_2FCO^-K^+$ with a small amount of KF being admixed therewith.

*Analysis.*—Calculated (percent): C, 16.075; K, 17.445. Found (percent): C, 14.5, K, 20.0.

EXAMPLE 2

Into a flask equipped with a Dry-Ice condenser and a mechanical stirrer were placed 7.2 grams of potassium fluoride and 77 cc. of acetonitrile. The resulting suspension was stirred and 23 grams of gaseous hexafluoroacetone were added over a 20-minute period, during which time the temperature of the reaction mixture rose from 19.5° C. to 43.5° C. A solution of 28.6 grams of tetraethylammonium perchlorate dissolved in 110 cc. of acetonitrile was added to the reaction mixture resulting in the precipitation of $KClO_4$ which was removed by filtration. The filtrate was poured into 1 liter of benzene, thereby precipitating 11.4 grams of an organic salt of the formula $(CF_3)_2FCO^-(C^+H_3CH_2)_4N$ which was recovered by filtration.

EXAMPLE 3

A series of experiments were carried out in which organic salts of perhalogenated acetones were prepared in a manner similar to that described in Example 1, but, instead of precipitating the organic salts by adding the reaction mixture to benzene, fluorinated ethers were prepared by adding an olefin and a halogen to the reaction mixture. A typical example is as follows:

Into a flask equipped with a "Dry-Ice" condenser and a magnetic stirrer were placed 1.0 liters of acetonitrile and 116 grams of anhydrous potassium fluoride. The suspension was stirred and 166 grams of hexafluoroacetone were added over a one-hour period during which time most of the KF dissolved. Two hundred and fifty-four grams of iodine were added and then 39 liters of tetrafluoroethylene were added over a period of 5.5 hours with the temperature of the reaction mixture being about 26° C. The reaction mixture was stirred for an additional 15 hours and then poured into 1 liter of ice water. A solution of sodium sulfite was added until all the iodine was reduced and the solution became colorless. The reaction mixture was then diluted with 4 liters of water, following which the organic liquid was separated. The organic liquid was fractionally distilled to give a 17% yield of perfluoroisopropyl, 2′-iodotetrafluoroethyl ether having a boiling point of 86°–87° C./760 mm. Hg and a refractive index at 25° C. of 1.3155.

*Analysis.*—Calculated (percent): C, 14.6; I, 30.8. Found (percent): C, 14.7; I, 30.2.

The same fluorinated ether was produced by repeating the above procedure, substituting silver fluoride for the potassium fluoride. The organic salt intermediate formed in this reaction was:

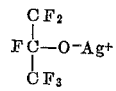

A number of different fluorinated ethers were prepared using the above procedure but substituting approximately equivalent molar proportions of other reactants. When the halogen compound added in the second step contained chlorine or bromine, the halogen was added slowly at the same time the olefin was added and the purification of the fluorinated ether was changed slightly. Potassium iodide was added to the reaction product to convert the remaining chlorine or bromine to KCl or KBr and the iodine thus formed was then reacted with sodium sulfite in the manner described above. In Table I there are set forth the reactants employed in the above procedures and the products obtained, while in Table II there are given the chemical analyses of these products.

TABLE I

| First reactants | | Organic salt intermediate | Second reactants | | Fluorinated ether product and yield | Refractive index of product /° C. | B.P. of product, ° C./mm. Hg |
|---|---|---|---|---|---|---|---|
| Ketone | Fluoride | | Olefin | Halogen | | | |
| $CF_3-\overset{O}{\overset{\|}{C}}-CF_3$ | KF | $CF_3-\overset{O^-K^+}{\underset{F}{\overset{\|}{C}}}-CF_3$ | $CF_2=CF_2$ | $I_2$ | $C_3F_7OCF_2CF_2I$<br>Yield: 17% | 1.3155/22 | 86–87/76 |
| $C_3-F\overset{O}{\overset{\|}{C}}-CF_3$ | KF | $CF_3-\overset{O^-K^+}{\underset{F}{\overset{\|}{C}}}-CF_3$ | $CF_2=CH_2$ | $I_2$ | $C_3F_7OCF_2CH_2I$<br>Yield: 34% | 1.3426/22 | 110/760 |
| $CF_3-\overset{O}{\overset{\|}{C}}-CF_3$ | KF | $CF_3-\overset{O^-K^+}{\underset{F}{\overset{\|}{C}}}-CF_3$ | $CF_2=CH_2$ | ICl | $C_3F_7OCF_2CH_2I$<br>Yield: 52% | 1.3426/22 | 110/760 |
| $CF_3-\overset{O}{\overset{\|}{C}}-CF_3$ | KF | $CF_3-\overset{O^-K^+}{\underset{F}{\overset{\|}{C}}}-CF_3$ | $CFH=CH_2$ | $I_2$ | $C_3F_7OCFHCH_2I$<br>Yield: 31% | 1.3600/20 | 60–63/100 |
| $CF_3-\overset{O}{\overset{\|}{C}}-CF_3$ | KF | $CF_3-\overset{O^-K^+}{\underset{F}{\overset{\|}{C}}}-CF_3$ | $CH_2=CH_2$ | $I_2$ | $C_3F_7OCH_2CH_2I$<br>Yield: 15% | 1.3680/23 | 45–47/100 |
| $CF_3-\overset{O}{\overset{\|}{C}}-CF_3$ | CsF | $CF_3-\overset{O^-Cs^+}{\underset{F}{\overset{\|}{C}}}-CF_3$ | $CF_3CF=CF_2$ | $I_2$ | $C_3F_7OCF_2\underset{CF_3}{\overset{\|}{C}}FI$<br>Yield: 13% | 1.3147/23 | 110–111/75⁰ |
| $CF_3-\overset{O}{\overset{\|}{C}}-CF_3$ | –KF | $CF_3-\overset{O^-K^+}{\underset{F}{\overset{\|}{C}}}-CF_3$ | $CF_2=CFCl$ | $I_2$ | $C_3F_7OCF_2CFClI$<br>Yield: 27% | 1.3465/23 | 19–21/15 |
| $CF_3-\overset{O}{\overset{\|}{C}}-CF_3$ | KF | $CF_3-\overset{O^-K^+}{\underset{F}{\overset{\|}{C}}}-CF_3$ | $CF_2=CFBr$ | $I_2$ | $C_3F_7OCF_2CFBrI$<br>Yield: 27% | 1.3665/23 | 16–17/6 |
| $CF_3-\overset{O}{\overset{\|}{C}}-CF_2Cl$ | KF | $CF_3-\overset{O^-K^+}{\underset{F}{\overset{\|}{C}}}-CF_2Cl$ | $CF_2=CF_2$ | $I_2$ | $C_3F_6ClOCF_2CF_2I$<br>Yield: 25% | 1.3566/22 | 115–117/760 |
| $CF_2Cl-\overset{O}{\overset{\|}{C}}-CF_2Cl$ | KF | $CF_2Cl-\overset{O^-K^+}{\underset{F}{\overset{\|}{C}}}-CF_2Cl$ | $CF_2=CF_2$ | $I_2$ | $C_3F_5Cl_2OCF_2CF_2I$<br>Yield: 24% | 1.3764/23 | 54.5–55.5/28 |
| $CF_2Cl-\overset{O}{\overset{\|}{C}}-CFCl_2$ | CsF | $CF_2Cl-\overset{O^-Cs^+}{\underset{F}{\overset{\|}{C}}}FCl_2$ | $CF_2=CF_2$ | $I_2$ | $C_3F_4Cl_3OCF_2CF_2I$<br>Yield: 15% | 1.4008/23 | 36–37/50 |
| $CF_3-\overset{O}{\overset{\|}{C}}-CF_3$ | KF | $CF_3-\overset{O^-K^+}{\underset{F}{\overset{\|}{C}}}-CF_3$ | $CF_2=CH_2$ | $Br_2$ | $C_3F_7OCF_2CH_2Br$<br>Yield: 51% | 1.3090=23 | 92–94/760 |
| $CF_3-\overset{O}{\overset{\|}{C}}-CF_3$ | KF | $CF_3-\overset{O^-K^+}{\underset{F}{\overset{\|}{C}}}-CF_3$ | $CFH=CH_2$ | $Br_2$ | $C_3F_7OCFHCH_2Br$<br>Yield: 33% | 1.3215/23 | 99.5–100/760 |
| $CF_3-\overset{O}{\overset{\|}{C}}-CF_3$ | KF | $CF_3-\overset{O^-K^+}{\underset{F}{\overset{\|}{C}}}-CF_3$ | $CF_2=CH_2$ | $Cl_2$ | $C_3F_7OCF_2CH_2Cl$<br>Yield: 42% | 1.2925–24 | 76–77/760 |
| $CF_3-\overset{O}{\overset{\|}{C}}-CF_3$ | KF | $CF_3-\overset{O^-K^+}{\underset{F}{\overset{\|}{C}}}-CF_3$ | $CH_3-CH_2-CH=CH_2$ | $Br_2$ | Isomeric mixture:<br>(a) $C_3F_7O-\underset{}{\overset{C_2H_5}{\overset{\|}{C}H}}-CH_2-Br$<br>Yield: 9%<br>(b) $C_3F_7O-CH_2-\underset{}{\overset{C_2H_5}{\overset{\|}{C}H}}-Br$<br>Yield: 6% | 1.3561/24 | 50–51/40 |
| $CF_3-\overset{O}{\overset{\|}{C}}-CF_3$ | KF | $CF_3-\overset{O^-K^+}{\underset{F}{\overset{\|}{C}}}-CF_3$ | $CF_2=CF_2$ | $Br_2$ | $C_3F_7O-CF_2CF_2Br$<br>Yield: 28% | 1.2850/24 | 65–66/760 |

TABLE I

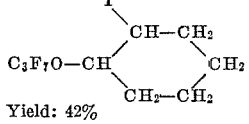

TABLE II

| Compound | Percent carbon | | Percent hydrogen | | Percent fluorine | | Percent iodine | | Percent chlorine or bromine | |
|---|---|---|---|---|---|---|---|---|---|---|
| | Found | Calc. | Found | Calc. | Found | Calc. | Found | Calc. | Found | Calc. |
| $C_3F_7OCF_2CF_2I$ | 14.7 | 14.6 | | | | | 30.2 | 30.8 | | |
| $C_3F_7OCF_2CH_2I$ | 15.96 | 15.96 | 0.42 | 0.56 | 43.0 | 45.5 | 34.3 | 33.8 | | |
| $C_3F_7OCFHCH_2I$ | 16.8 | 16.8 | 0.81 | 0.84 | 41.0 | 42.4 | 34.8 | 35.5 | | |
| $C_3F_7OCH_2CH_2I$ | 17.5 | 17.6 | 1.32 | 1.20 | 39.5 | 39.1 | 37.3 | 37.4 | | |
| $C_3F_7OCF_2\!-\!CFI$ $\;\;\;\;\;\;\;\;\;\;\;\;\;\;\;\;\;\;\;|$ $\;\;\;\;\;\;\;\;\;\;\;\;\;\;\;\;\;\;CF_3$ | 16.1 | 15.6 | | | 49.0 | 53.5 | 26.8 | 27.5 | | |
| $C_3F_7OCF_2CFClI$ | 13.9 | 14.0 | | | 41.0 | 44.3 | 28.6 | 29.6 | 8.8 (Cl) | 8.3 |
| $C_3F_7OCF_2CFBrI$ | 13.1 | 12.7 | | | 40.2 | 40.2 | 26.3 | 26.9 | | |
| $C_3F_6ClOCF_2CF_2I$ | 13.7 | 14.0 | | | 43.3 | 44.3 | 30.5 | 29.6 | 7.1 (Cl) | 8.3 |
| $C_3F_5Cl_2OCF_2CF_2I$ | 13.7 | 13.5 | | | 37.8 | 38.6 | 28.6 | 28.4 | 15.3 (Cl) | 15.8 |
| $C_3F_4Cl_3OCF_2CF_2I$ | 13.4 | 13.0 | | | 35.5 | 32.9 | 26.3 | 27.5 | 23.8 (Cl) | 23.1 |
| $C_3F_7OCF_2CH_2Br$ | 18.15 | 18.2 | 0.86 | 0.61 | | | | | 22.2 (Br) | 24.3 |
| $C_3F_7OCFHCH_2Br$ | 19.3 | 19.3 | 0.86 | 1.0 | 45.7 | 48.9 | | | 25.7 (Br) | 25.7 |
| $C_3F_7OCF_2CH_2Cl$ | 21.5 | 21.1 | 1.18 | 0.70 | | | | | 11.9 (Cl) | 12.5 |
| Isomeric mixture: (a) $C_3S_7O\!-\!CH(C_2H_5)\!-\!CH_2Br$ (b) $C_3S_7\!-\!O\!-\!CH_2\!-\!CHBr(C_2H_5)$ | 26.6 | 26.2 | 2.75 | 2.49 | | | | | 26.9 (Br) | 24.9 |
| $C_3F_7OCF_2CF_2Br$ | 16.4 | 16.4 | | | | | | | 19.7 (Br) | 21.9 |
| Isomeric mixture: (a) $C_3F_7OCHClCH_2I$ (b) $C_3F_7OCH_2CHClI$ | 16.3 | 16.0 | 0.96 | 0.80 | | | 33.8 | 33.9 | 11.5 (Cl) | 9.5 |
| $C_3P_7O\!-\!\text{cyclohexyl-I}$ | 27.2 | 27.4 | 2.80 | 2.56 | | | 32.1 | 32.2 | | |
| $C_3F_7OCH_2CH_2Br$ | 20.9 | 20.5 | 1.74 | 1.40 | | | | | 29.9 (Br) | 27.3 |
| $C_3S_7OCHCH_2Br$ $\;\;|$ $\;\;C_8H_{17}$ | 37.8 | 38.5 | 5.13 | 4.9 | 32.8 | | 25.5 (Br) | | 19.8 | |

EXAMPLE 4

Into a flask equipped with Dry-Ice condenser and a stirrer were placed 250 ml. of acetonitrile and 76 grams of cesium fluoride. The suspension was stirred and 41 grams of perfluoropropionyl fluoride were added over a one-hour period. During this addition, the heat of reaction caused the temperature to rise to 50° C. and the flask was then cooled with ice for the remainder of the reaction. A solution of 41 grams of iodine chloride in 100 ml. of acetonitrile was added over a six-hour period while simultaneously adding 20 liters of gaseous $CF_2\!=\!CH_2$.

The reaction mixture was poured into one liter of ice water and 1.3 grams of $Na_2SO_3$ were added. The organic layer was separated and fractionally distilled to give a ether having a refractive index of 1.3390/24° C. and a 16% yield of perfluoropropyl, 2' - iodo-1',1'-difluoroethyl boiling point of 51°–52° C./90 mm. Hg.

*Analysis.*—Calculated (percent): C, 16.0; H, 0.50; I, 33.8. Found (percent): C, 16.2; H, 0.64; I, 34.0.

EXAMPLE 5

Into a flask equipped with a Dry-Ice condenser and a stirrer were placed 250 ml. of acetonitrile and 15 grams of potassium fluoride. The suspension was stirred and 45 grams of perfluoropropionyl chloride were added over a one-hour period. After the addition of 10 grams of the perfluoropropionyl chloride, a 40-gram charge of cesium fluoride was added to the reaction mixture. During the reaction, the temperature of the reaction mixture rose from 24° C. to 40° C. at which time the flask was cooled with cold water.

The resulting solution was saturated with ethylene. A solution of 40 grams of bromine in 250 ml. of acetonitrile and 28 liters of gaseous ethylene were then simultaneously added over a seven-hour period. The resulting product was poured in ice water and a solution of 2.49 grams of $Na_2SO_3$ in 12 cc. of water was added. The organic layer was separated and fractionally distilled to give a 17% yield of perfluoropropyl, 2'-bromoethyl ethyl having a refractive index of 1.3458/24° C. and a boiling point of 88°–90° C./760 mm. Hg.

*Analysis.*—Calculated (percent): 20.5; H, 1.40; Br, 27.3. Found (percent): C, 20.9; H, 1.74; Br, 29.9.

EXAMPLE 6

Into a flask equipped with a Dry-Ice condenser and a magnetic stirrer were added 21.6 grams of bromobenzene, 3.35 grams of magnesium, and 150 ml. of anhydrous ethyl ether, and a Grignard reagent was prepared in the standard manner under a nitrogen atmosphere. The reaction flask was cooled with Dry Ice and an additional 50 ml. of anhydrous ethyl ether were added. A solution of 51.5 grams of perfluoroisopropyl, 2'-iodotetrafluoroethyl ether and 50 ml. of ethyl ether was added to the reaction mixture which was then stirred for one-half hour. Another 100 ml. of ethyl ether were added and the reaction mixture allowed to warm to −42° C. Carbon dioxide was bubbled into the reaction mixture at a rate of 0.1 mol per hour for two hours. Stirring was then continued for sixteen hours while allowing the reaction mixture to warm to room temperature.

The reaction mixture was next cooled to 0° C. and 400 ml. of precooled 24% sulfuric acid were added. The ether layer was separated and the aqueous layer extracted three times with 100 ml. portions of ethyl ether. The ether solutions were combined and a product consisting primarily of $(CF_3)_2 FCOCF_2 CF_2 COOH$ was obtained by fractional distillation. The product was dissolved in absolute methyl alcohol and titrated with a solution of 2 N sodium hydroxide in methyl alcohol to the phenolphthalein end point. The solution was flash evaporated under reduced pressure to dryness, yielding 9.1 grams of

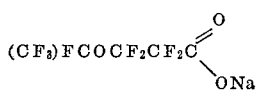

The effect of this composition on the surface tension of water was determined by measuring the surface tensions of a series of aqueous solutions with a tensiometer in accordance with ASTM Test D–1590. The results were as follows.

| Concentration of fluorinated salt in water (wt. percent): | Surface tension (dynes/cm.) |
|---|---|
| 0 | 73.0 |
| 0.14 | 57.2 |
| 0.27 | 44.0 |
| 0.53 | 37.0 |
| 1.25 | 34.6 |
| 2.30 | 29.6 |
| 3.70 | 23.0 |
| 5.50 | 22.6 |

The corresponding acid was prepared by acidifying the above sodium salt with HCl to a pH of 1.5. The effect of this acid on the surface tension of water was tested and the results were as follows:

| Concentration of fluorinated acid in water (wt. percent): | Surface tension (dynes/cm.) |
|---|---|
| 0.63 | 32.8 |
| 0.90 | 27.5 |
| 1.20 | 22.3 |
| 1.70 | 17.6 |
| 2.10 | 16.6 |

EXAMPLE 7

A suspension of 2.6 grams of magnesium in 1000 cc. of ethyl ether was placed in a flask equipped with a Dry Ice condenser and a magnetic stirrer, and 20 cc. of bromobenzene were added to form the Grignard reagent $C_6H_5MgBr$. The reaction mixture was cooled to −75° C. with Dry Ice and nitrogen are bubbled through the solution to remove all the oxygen. A solution of 45 grams of 1,3-dichloropentafluoroisopropyl,2'iodotetrafluoroethyl ether in 50 ml. of ethyl ether was added to the reaction mixture with stirring over a period of 15 minutes. The reaction mixture was allowed to warm to −40° C. and carbon dioxide was passed through the reaction mixture for two hours at a rate of 0.1 mol per hour. The reaction mixture was warmed to room temperature and then flash evaporated to remove the ether solvent. The residue was washed with hexane and then treated with an excess of aqueous sulfuric acid. The aqueous layer was extracted with ether and the ether solution fractionally distilled to give

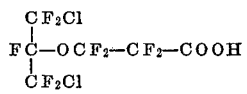

having a boiling point of 60°–70° C./2 mm. Hg.

The effect of this acid on the surface tension of water was determined in the manner described in Example 4.

| Concentration of acid in water (wt. percent): | Surface tension (dynes/cm.) |
|---|---|
| 0 | 73.0 |
| 0.33 | 40.1 |
| 0.67 | 37.2 |
| 1.10 | 33.4 |
| 1.46 | 30.0 |
| 1.75 | 28.4 |

EXAMPLE 8

A series of experiments were run to prepare fluorinated ethers in solvent media other than acetonitrile. A typical procedure is as follows:

Into a flask equipped with a Dry Ice condenser and a magnetic stirrer were placed 32 grams of anhydrous cesium fluoride and 200 ml. of dry nitrobenzene. The resulting suspension was stirred and 33 grams of gaseous hexafluoroacetone were added. A temperature rise of 10° C. was noticed. Vinylidene fluoride was bubbled through the resulting suspension for one hour during which period 32 grams of bromine were added dropwise. The solution was stirred for another hour, then the solution filtered, and the filtrate distilled at atmospheric pressure. Fifty-two grams of a product (boiling point 84°–86° C.) were obtained which was analyzed by vapor phase chromatographic analysis and shown to be a mixture of 49 grams $C_3F_7OCF_2CH_2Br$ and 3 grams $BrCF_2CH_2Br$. The pure product was separated from the dibromide by another distillation.

In a similar manner fluorinated ethers were prepared in 2-methyl sulfolane, butyrolactone, and dimethyl formamide.

| Solvent | Ketone | Fluoride | Olefin | Halogen | Product and yield |
|---|---|---|---|---|---|
| 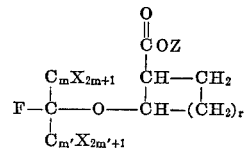 | $CF_3-\overset{O}{\overset{\|}{C}}-CF_3$ | CsF | $CH_2=CH_2$ | $Br_2$ | $C_3F_7OCH_2CH_2Br$ Yield· 14% |
| 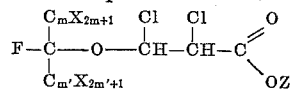 | $CF_3-\overset{O}{\overset{\|}{C}}-CF_3$ | KF | $CH_2=CH_2$ | $Br_2$ | $C_3F_7OCH_2CH_2Br$ Yield· 4% |
| 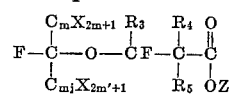 | $CH_3-\overset{O}{\overset{\|}{C}}-CF_3$ | CsF | $CF_2=CH_2$ | $Br_2$ | $C_3F_7OCF_2Br$ Yield· 74% |
| 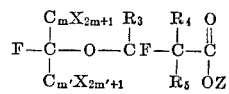 | | | | | |
| 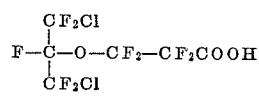 | $CF_3-\overset{O}{\overset{\|}{C}}-CF_3$ | KF | $CFH=CH_2$ | $Br_2$ | $C_3F_7OCFHCH_2Br$ Yield· 10% |

EXAMPLE 9

The compound 2-trifluoromethyl-3-perfluoropentanone was prepared in accordance with the method of Smith et al. (Journal of the American Chemical Society, 1962, vol. 84, page 4285), by reacting perfluoropropylene with perfluoropropionyl fluoride in acetonitrile using cesium fluoride as a catalyst. Thirty-one grams of cesium fluoride and 200 ml. of acetonitrile were admixed in a flask equipped with a Dry Ice condenser and 26 grams of 2-trifluoromethyl-3-perfluoropentanone were added over a one-hour period. Thirty-two grams of bromine were then added dropwise over a six-hour period while simutlaneously bubbling vinylidene fluoride through the reaction mixture.

The reaction mixture was poured into one liter of ice water. The lower layer was collected and washed with water. Two immiscible liquids were obtained, the lighter of which was distilled to give 10 grams of the compound

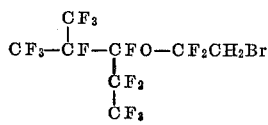

This compound had a boiling point of 140°–142° C. and a refractive index of 1.3185/24° C.

EXAMPLE 10

Perfluoroctanoic acid fluoride was prepared by reacting the corresponding acid chloride with potassium fluoride in acetonitrile. Forty-two grams of the acid fluoride were added over a one-hour period to a reaction mixture containing 20 grams of cesium fluoride and 250 cc. of acetonitrile. Sixteen and one-half grams of cyclohexene were added to the reaction mixture following which a solution of 32 grams of iodine monochloride dissolved in acetonitrile were added dropwise over a two-hour period. After stirring overnight, the reaction mixture was poured into cold water. The lower layer was separated and washed with water and then dilute ammonia. The resulting material as distilled leaving 2 grams of solid material in the distillation flask. The solid material was analyzed by infrared spectrum analysis and nuclear magnetic resonance and found to be the compound

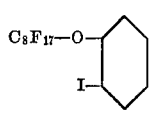

It will be apparent that many modifications and variations may be effected without departing from the scope of the novel concepts of the present invention, and the illustrative details disclosed are not to be construed as imposing undue limitations on the invention.

We claim:
1. A fluorinated compound of the formula:

$$\begin{array}{c} \phantom{F-}\overset{O}{\overset{\|}{C}}OZ \\ C_mX_{2m+1}\quad \overset{|}{C}H-CH_2 \\ F-\overset{|}{C}\phantom{x}\text{---}O\text{---}\overset{|}{C}H-(CH_2)_p \\ \overset{|}{C_{m'}X_{2m'+1}} \end{array}$$

wherein $m$ and $m'$ are integers of 1 to 8 with the sum of $m$ and $m'$ not exceeding 10; X at each occurrence is independently fluorine or chlorine with at least one X substituent on each carbon atom being fluorine; Z is hydrogen or alkali metal; and $p$ is an integer of 1 to 9.

2. A fluorinated compound of the formula:

$$\begin{array}{c} C_mX_{2m+1}\quad Cl\quad Cl\quad\quad O \\ F-\overset{|}{C}\text{---}O\text{---}\overset{|}{C}H-\overset{|}{C}H-C\overset{\diagup}{\diagdown}OZ \\ \overset{|}{C_{m'}X_{2m'+1}} \end{array}$$

wherein $m$ and $m'$ are integers of 1 to 8 with the sum of $m$ and $m'$ not exceeding 10, and wherein Z is hydrogen or alkali metal.

3. A fluorinated compound of the formula:

$$\begin{array}{c} C_mX_{2m+1}\quad R_3\quad R_4\quad O \\ F-\overset{|}{C}\text{---}O\text{---}\overset{|}{C}F-\overset{|}{C}-\overset{\|}{C} \\ \overset{|}{C_{mj}X_{2m'+1}}\quad\quad R_5\quad OZ \end{array}$$

wherein $m$ and $m'$ are integers of 1 to 8 with the sum of $m$ and $m'$ not exceeding 10, wherein $R_3$ and $R_4$ are hydrogen, wherein $R_5$ is perfluorinated alkyl of 1 to 16 carbon atoms and wherein Z is hydrogen or alkali metal.

4. A fluorinated compound of the formula:

$$\begin{array}{c} C_mX_{2m+1}\quad R_3\quad R_4\quad O \\ F-\overset{|}{C}\text{---}O\text{---}\overset{|}{C}F-\overset{|}{C}-\overset{\|}{C} \\ \overset{|}{C_{m'}X_{2m'+1}}\quad\quad R_5\quad OZ \end{array}$$

wherein $m$ and $m'$ are integers of 1 to 8 with the sum of $m$ and $m'$ not exceeding 10, wherein $R_3$ and $R_4$ are hydrogen, wherein $R_5$ is fluorine, chlorine, bromine, iodine, or perfluorinated alkyl of 1 to 6 carbon atoms, and wherein Z is hydrogen or alkali metal.

5. A fluorinated acid of the formula:

$$\begin{array}{c} CF_2Cl \\ F-\overset{|}{C}-O-CF_2-CF_2COOH \\ \overset{|}{C}F_2Cl \end{array}$$

References Cited
UNITED STATES PATENTS

| | | | |
|---|---|---|---|
| 2,713,593 | 7/1955 | Brice et al. | 260—535 |
| 3,145,222 | 8/1964 | Brace | 260—408 |
| 3,409,647 | 11/1968 | Pittman et al. | 260—535 XR |

JAMES A. PATTEN, Primary Examiner

P. J. KILLOS, Assistant Examiner

U.S. Cl. X.R.

252—351; 260—33.2, 408, 430, 535, 544, 567.6, 593, 611, 614, 633

PO-1050
(5/69)

UNITED STATES PATENT OFFICE
CERTIFICATE OF CORRECTION

Patent No. __3,542,859__    Dated __November 24, 1970__

Inventor(s) __Morton H. Litt and Francis W. Evans__

It is certified that error appears in the above-identified patent and that said Letters Patent are hereby corrected as shown below:

Column 1, lines 25-29, omit entire paragraph.

Column 2, line 32, "O+M-" should be --O-M+--;

line 59, "R3CF4=CFR4" should be --R3CF=CR4R5--;

$$\text{and } \begin{array}{c} R_4 \\ | \\ -CY \\ | \\ R_3 \end{array} \quad \text{should be} \quad \begin{array}{c} R_4 \\ | \\ -CY \\ | \\ R_5 \end{array}$$

line 64, $\begin{array}{c} CH_2 \\ (CH_2)_p \end{array}$ should be $\begin{array}{c} CH_2 \\ | \\ (CH_2)_p \end{array}$ (both occurrences)

Column 3, lines 18 and 20, "X$_{am}$" should be --X$_{2m}$--.

Column 4, line 42, $CH\begin{array}{c} CH \\ \diagdown CH_2 \end{array}$ should be $CH\begin{array}{c} =CH \\ \diagdown CH_2 \end{array}$ Column 5, line 5, "prefluoroisopropyl" should be --perfluoroisopropyl--;

line 9, "MgX" (first occurrence) should be --MgX'-- line 19, "OCF2CF3" should be --OCF2CF2--;

(Page 2)

PO-1050
(5/69)

UNITED STATES PATENT OFFICE
CERTIFICATE OF CORRECTION

Patent No. __3,542,859__   Dated __November 24, 1970__

Inventor(s) __Morton H. Litt and Francis W. Evans__

It is certified that error appears in the above-identified patent and that said Letters Patent are hereby corrected as shown below:

Column 5, line 20, $$\begin{matrix} C \\ | \\ CH \end{matrix} \quad \text{should be} \quad \begin{matrix} C \\ | \\ OH \end{matrix}$$

Column 6, line 55, $CF_2$ should be $CF_3$

Table (columns 7 and 8)

1st line of formulae, column 8,

"86-87/76" should be --86-87/760--.

2nd line of formulae, column 1,

"$C_3$-F" should be --$CF_3$--.

6th line of formulae, column 2,

"$C_5F$" should be --Cs--;

6th line of formulae, column 8,

"110-111/75°" should be --110-111/750--.

7th line of formulae, column 2,

"-KF" should be --KF--.

11th line of formulae, column 2,

"$C_5F$" should be --CsF--.

PO-1050
(5/69)

UNITED STATES PATENT OFFICE
CERTIFICATE OF CORRECTION

Patent No. 3,542,859     Dated November 24, 1970

Inventor(s) Morton H. Litt and Francis W. Evans

It is certified that error appears in the above-identified patent and that said Letters Patent are hereby corrected as shown below:

Table (columns 7 and 8) cont.

11th line of formulae, column 3,

"$Cl_1$" should be --$Cl_2$--.

12th line of formulae, column 6, no yield % was submitted in our application.

12th line of formulae, column 7,

"1.3090=23" should be --1.3090/23--.

14th line of formulae, column 7,

"1.2925-24" should be --1.2925/24--.

Table I (columns 9 and 10)

3rd line of formulae, column 3,

"$O-C_5^+$" should be --$O-Cs^+$--.

(Page 4)

PO-1050
(5/69)

UNITED STATES PATENT OFFICE
CERTIFICATE OF CORRECTION

Patent No. 3,542,859    Dated November 24, 1970

Inventor(s) Morton H. Litt and Francis W. Evans

It is certified that error appears in the above-identified patent and that said Letters Patent are hereby corrected as shown below:

Table II (columns 9 and 10)

15th line of formulae, column 1

"$C_3S_7$" should be --$C_3F_7$--.

16th line of formulae, column 1

"$C_3S_7$" should be --$C_3F_7$--.

21st line of formulae, column 1

"$C_3P_7O$" should be --$C_3F_7O$--.

23rd line of formulae, column 1

"$C_3S_7O$" should be --$C_3F_7O$--.

Column 10, lines 71 and 72, invert order of lines should read   --16% yield of perfluoropropyl, 2'-iodo-1',1'-difluoroethyl ether having a refractive index of 1.3390/24°C. and a--

Column 11, line 19, "ethyl" should be --ether--.

Table (columns 13 and 14)

2nd line of formulae, column 2

"C" should be $\overset{O}{\underset{\|}{C}}$ (Page 5)

PO-1050
(5/69)

UNITED STATES PATENT OFFICE
CERTIFICATE OF CORRECTION

Patent No. 3,542,859     Dated November 24, 1970

Inventor(s) Morton H. Litt and Francis W. Evans

It is certified that error appears in the above-identified patent and that said Letters Patent are hereby corrected as shown below:

Table (columns 13 and 14)

3rd line of formulae, column 5

"$C_3F_7OCF_2Br$" should be --$C_3F_7OCF_2CH_2Br$--

Claim 1, line 24, "$(CH_2)_r$" should be --$(CH_2)_p$--.

Claim 3, line 43, "$C_{mj}$" should be --$C_{m'}$--.

Claim 4, line 56, "1 to 6" should be --1 to 16--.

Signed and sealed this 14th day of September 1971.

(SEAL)
Attest:

EDWARD M. FLETCHER, JR.
Attesting Officer

ROBERT GOTTSCHALK
Acting Commissioner of Patents